US006285794B1

(12) United States Patent
Georgiev et al.

(10) Patent No.: US 6,285,794 B1
(45) Date of Patent: Sep. 4, 2001

(54) COMPRESSION AND EDITING OF MOVIES BY MULTI-IMAGE MORPHING

(75) Inventors: Todor Georgiev, Campbell, CA (US); Michael Wainer, Carbondale, IL (US)

(73) Assignee: Adobe Systems Incorporated

( * ) Notice: Subject to any disclaimer, the term of this patent is extended or adjusted under 35 U.S.C. 154(b) by 0 days.

(21) Appl. No.: 09/062,474

(22) Filed: Apr. 17, 1998

(51) Int. Cl.[7] .............................. G06K 9/36; G06K 9/46
(52) U.S. Cl. ...................... 382/243; 345/436; 345/474
(58) Field of Search ................................. 382/107, 190, 382/203, 225, 232, 235, 243, 264, 308; 345/433, 436, 441, 434, 475; 348/580, 699, 700; 375/240.08

(56) References Cited

U.S. PATENT DOCUMENTS

| | | | |
|---|---|---|---|
| 5,065,447 | 11/1991 | Barnsley et al. | 382/56 |
| 5,387,937 | * 2/1995 | Dorricott et al. | 348/395 |
| 5,467,413 | * 11/1995 | Barrett | 382/236 |
| 5,613,048 | * 3/1997 | Chen et al. | 395/119 |
| 5,745,668 | * 4/1998 | Poggio et al. | 395/175 |
| 5,802,220 | * 9/1998 | Black et al. | 382/276 |
| 5,974,159 | * 10/1999 | Lubin et al. | 382/106 |
| 6,008,820 | * 12/1999 | Chauvin et al. | 345/502 |

OTHER PUBLICATIONS

Gonzalez et al., Digital Image Processing, Sep. 1993, p. 148–156.*

T.Georgiev et al., "Morphing Between Multiple Images," S.Illinois Univ. at Cardbondale dept. of Comp. Science, Technical Report, pp. 17, Apr. 17, 1997.

T.Georgiev, "Morphing Between Multiple Images: Theory and Applications," Thesis, S.Illinois Univ. at Cardbondale Dept. of Comp. Science, pp. 45, Jun. 1997.

T. Georgiev, "Movie Compression and Motion Editing by Multi–Image Morphing," available at www.graphics-.lcs.mit.edu/~mcmillan/BRWorkshop/RegPost.html, Mar. 1998.

Seungyong Lee et al., "Polymorph: Morphing Among Multiple Images," IEEE, 60–73, 1998.

Jain et al., "Algorithms for Clustering Data," Prentice hall, Englewood Cliffs, NJ, 24–36, 1988.

Turk et al., "Eigenfaces for Recognition," Massachusetts Institute of Technology, Journal of Cognitive Neuroscience vol.3,No. 1, 72–86, 1991.

Devijver et al., "Pattern Recognition: a Statistical Approach," Prentice Hall International, 301–341, 1982.

George Wolberg, "Digital Image Warping," IEEE Computer Society, 41–65, 1990.

Klaus et al., "Robot Vision," The MIT Electrical Engineering and Computer Science Series, 279–95, 1986.

Johnson et al., "Applied Multivariate Statistical Analysis," University of Wisconsin–Madison, Prentice–Hall, Inc., 361–388, 1982.

Beymer et al., "Example Based Image Analysis and Synthesis," Massachusetts Institute of Technology Artificial Intelligence Laboratory, Memo No. 1431, Paper No.80, 21 pgs., Nov. 1993.

Seitz et al., "View Mrophing," Department of Computer Sciences University of Wisconsin–Madison, 10 pgs., 1986.

"Motion Field & Optical Flow," Motion Field 12, 279–295.

Wolberg, "Spatial Transformations," Chapter 3, 41–65, 1990.

* cited by examiner

*Primary Examiner*—Jon Chang
*Assistant Examiner*—Timothy M. Johnson
(74) *Attorney, Agent, or Firm*—Fish & Richardson P.C.

(57) ABSTRACT

A computer-implemented method for representing a movie having a sequence of frames includes generating a pixel level frame to frame correspondence; representing the original frame sequence as a multi-image morph; and deriving from the multi-image morph a basis of feature vectors describing principal changes among frames and representing the movie in terms of the basis.

27 Claims, 6 Drawing Sheets

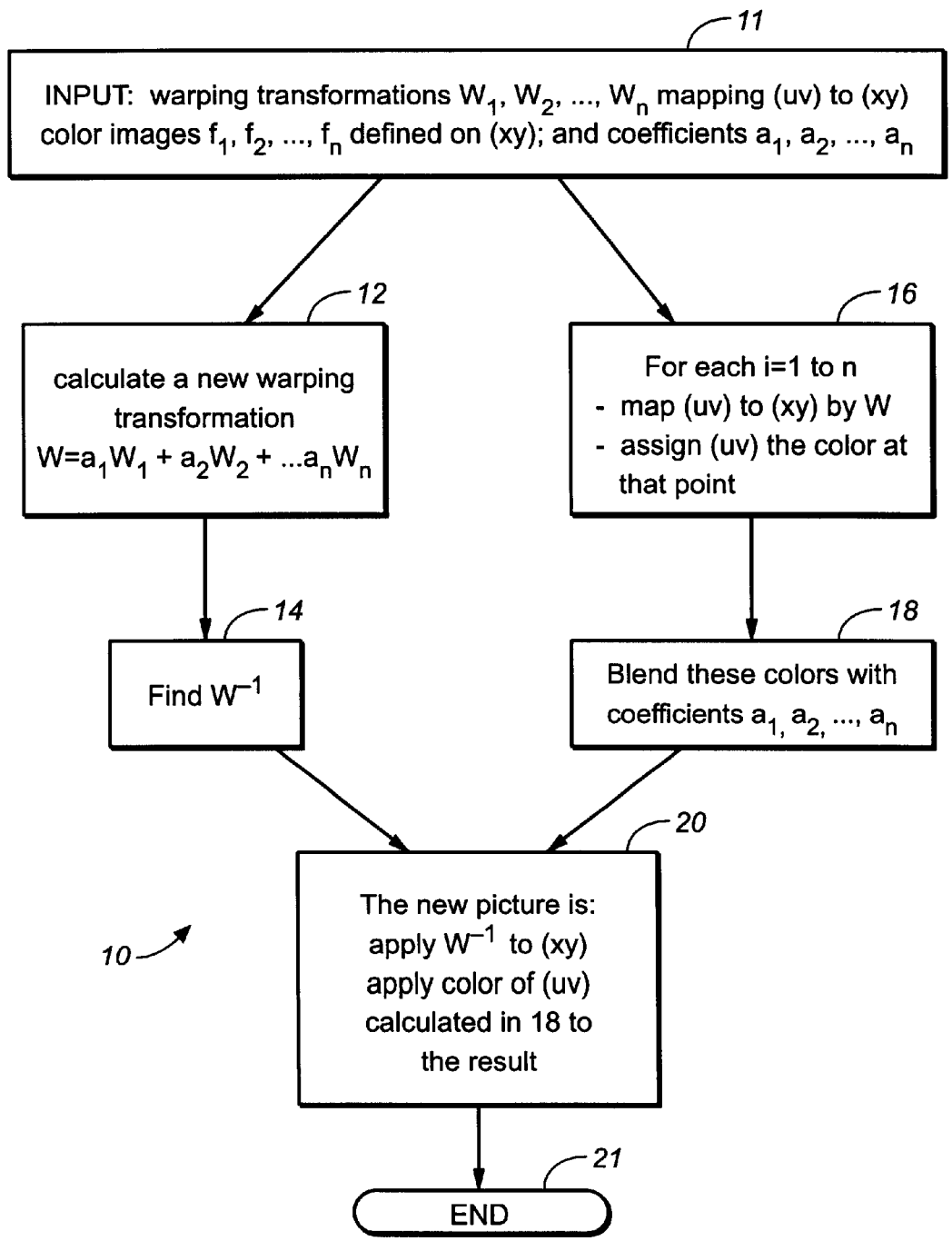
FIG._1

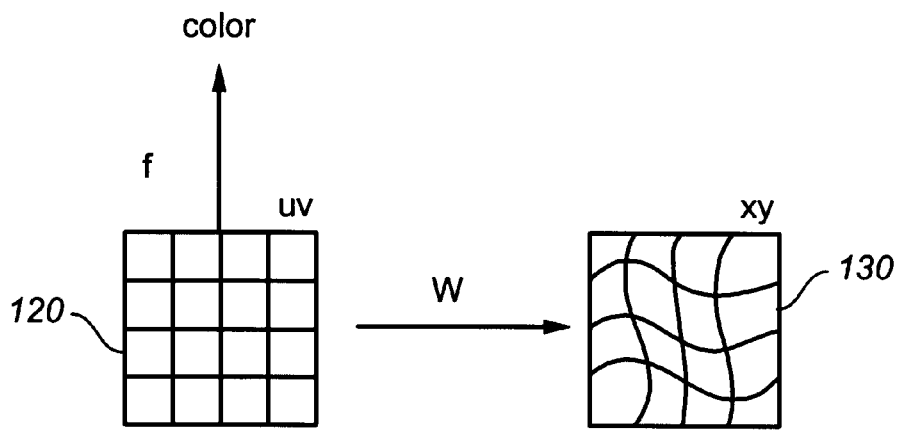
FIG._2
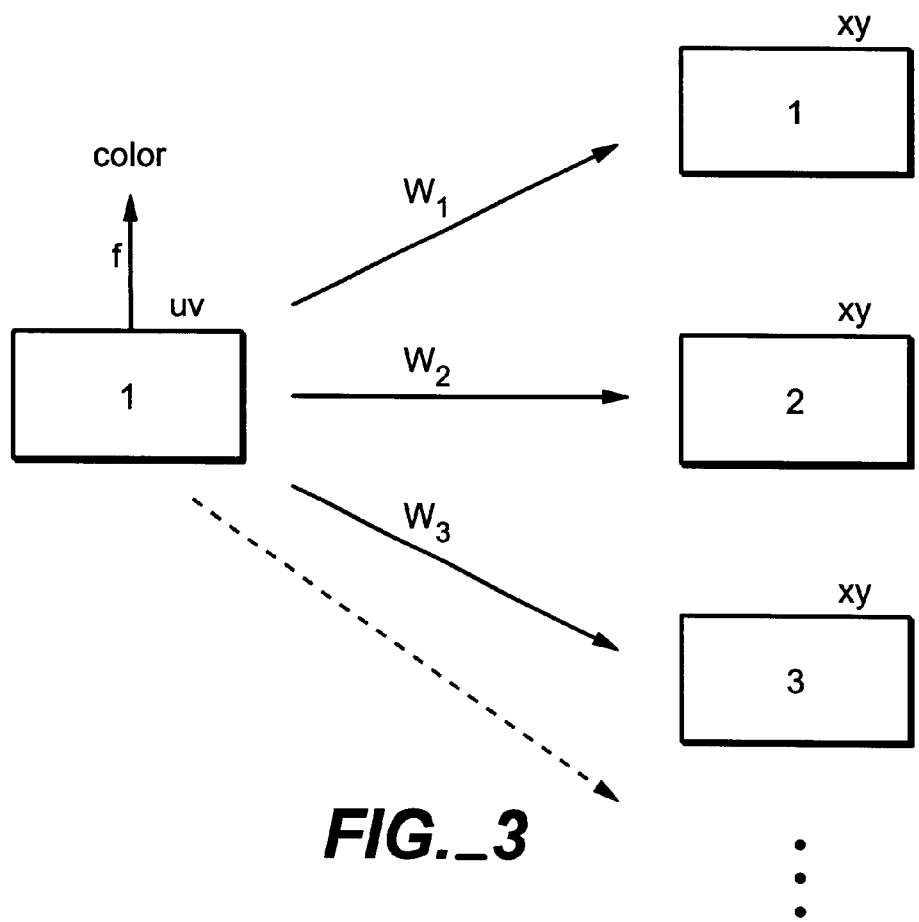
FIG._3

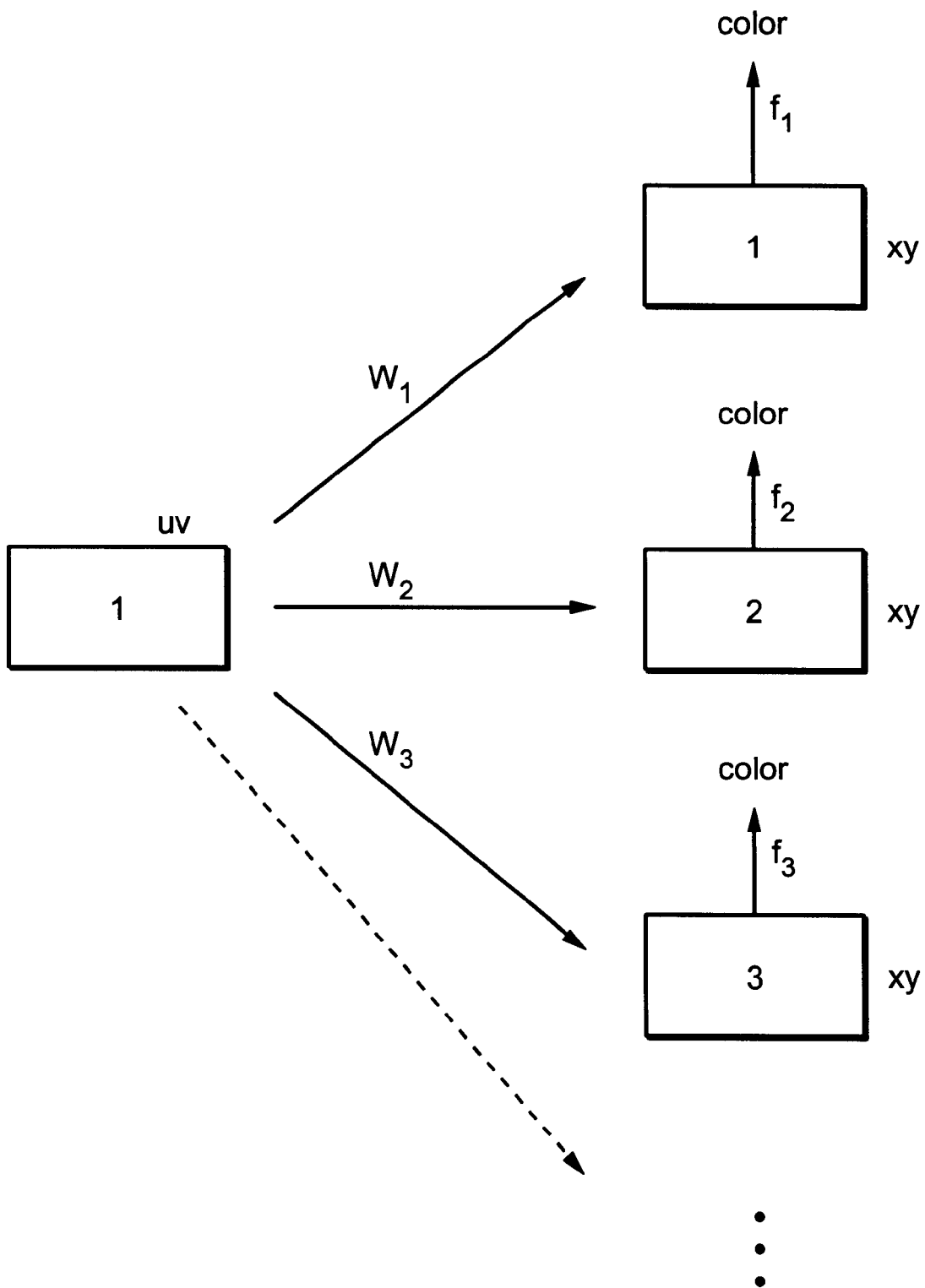
FIG._4

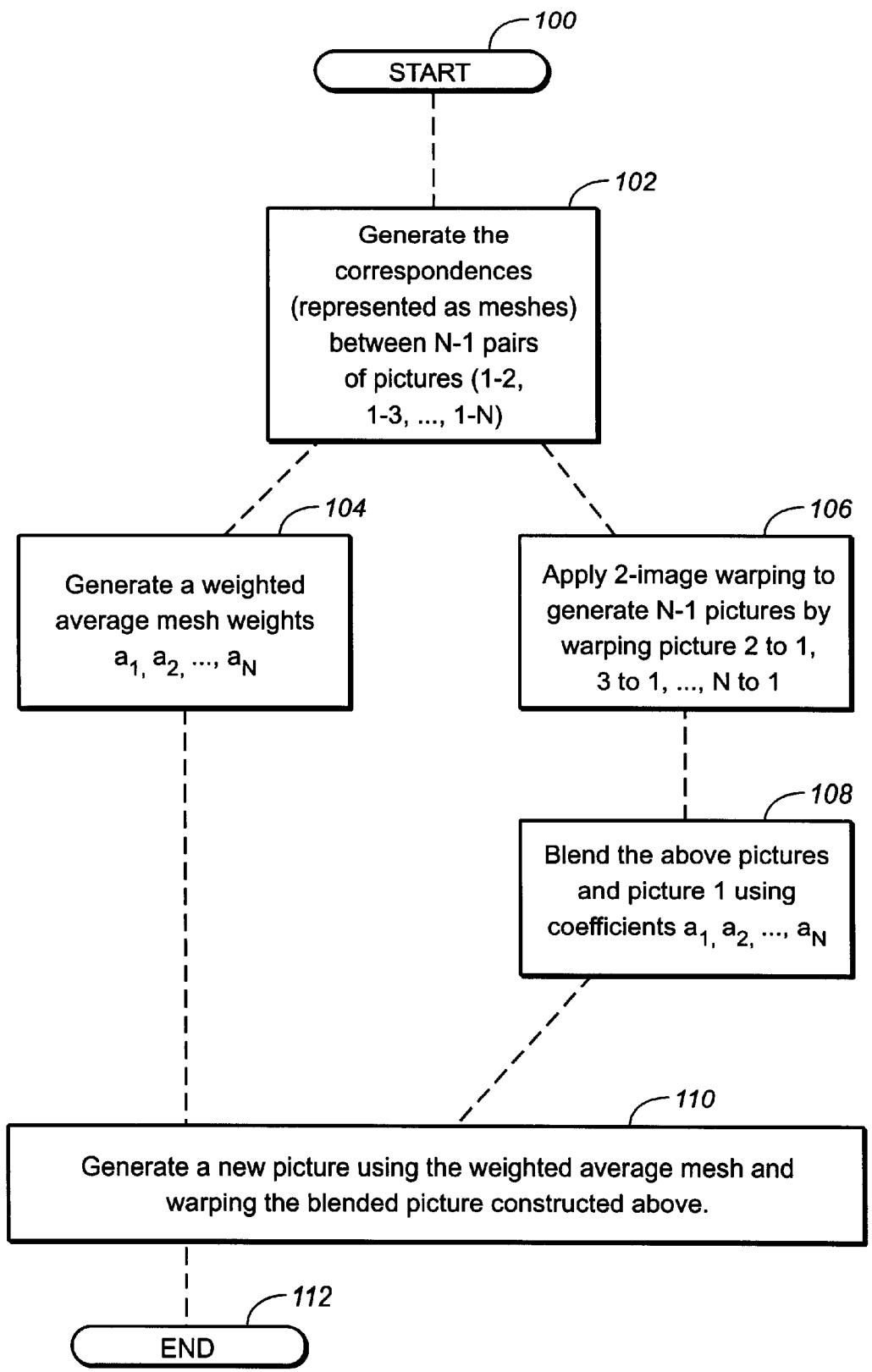
FIG._5

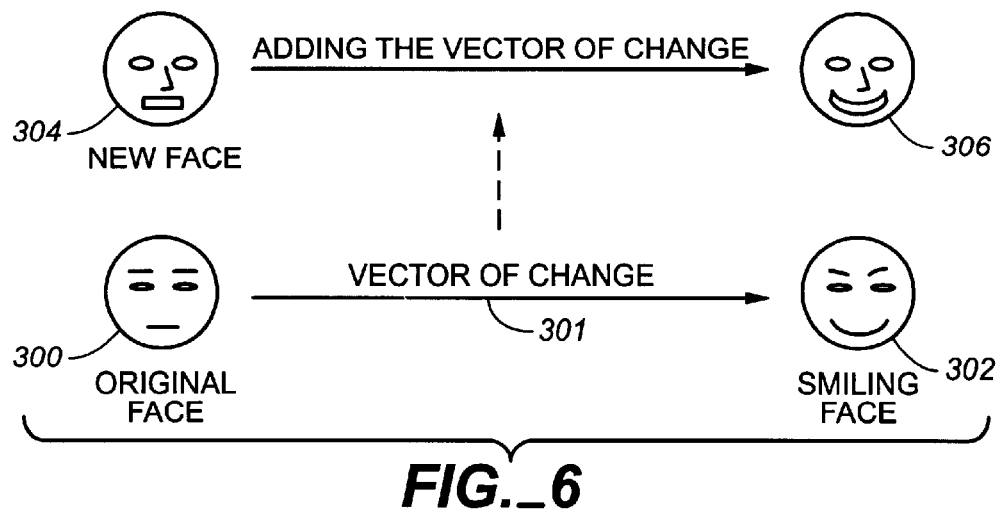
FIG._6
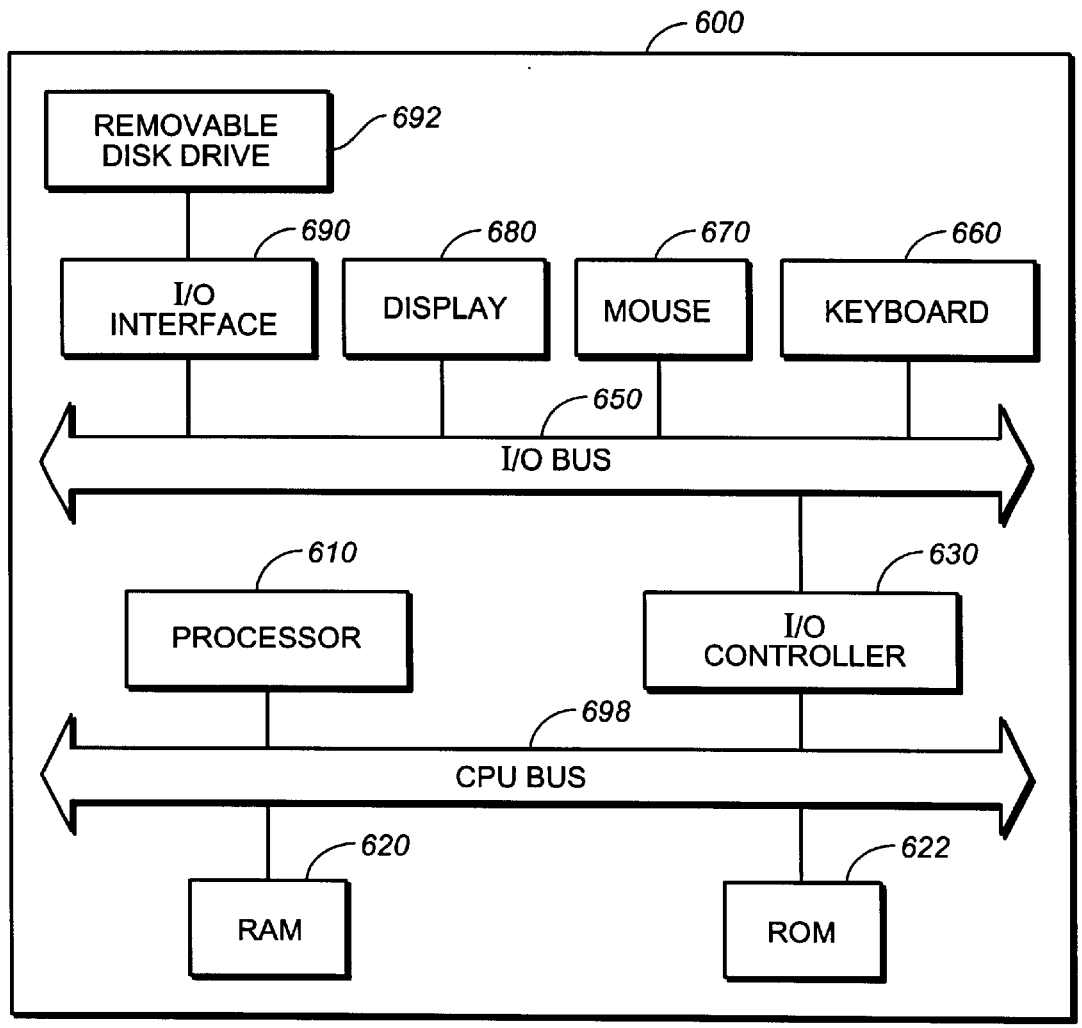
FIG._8

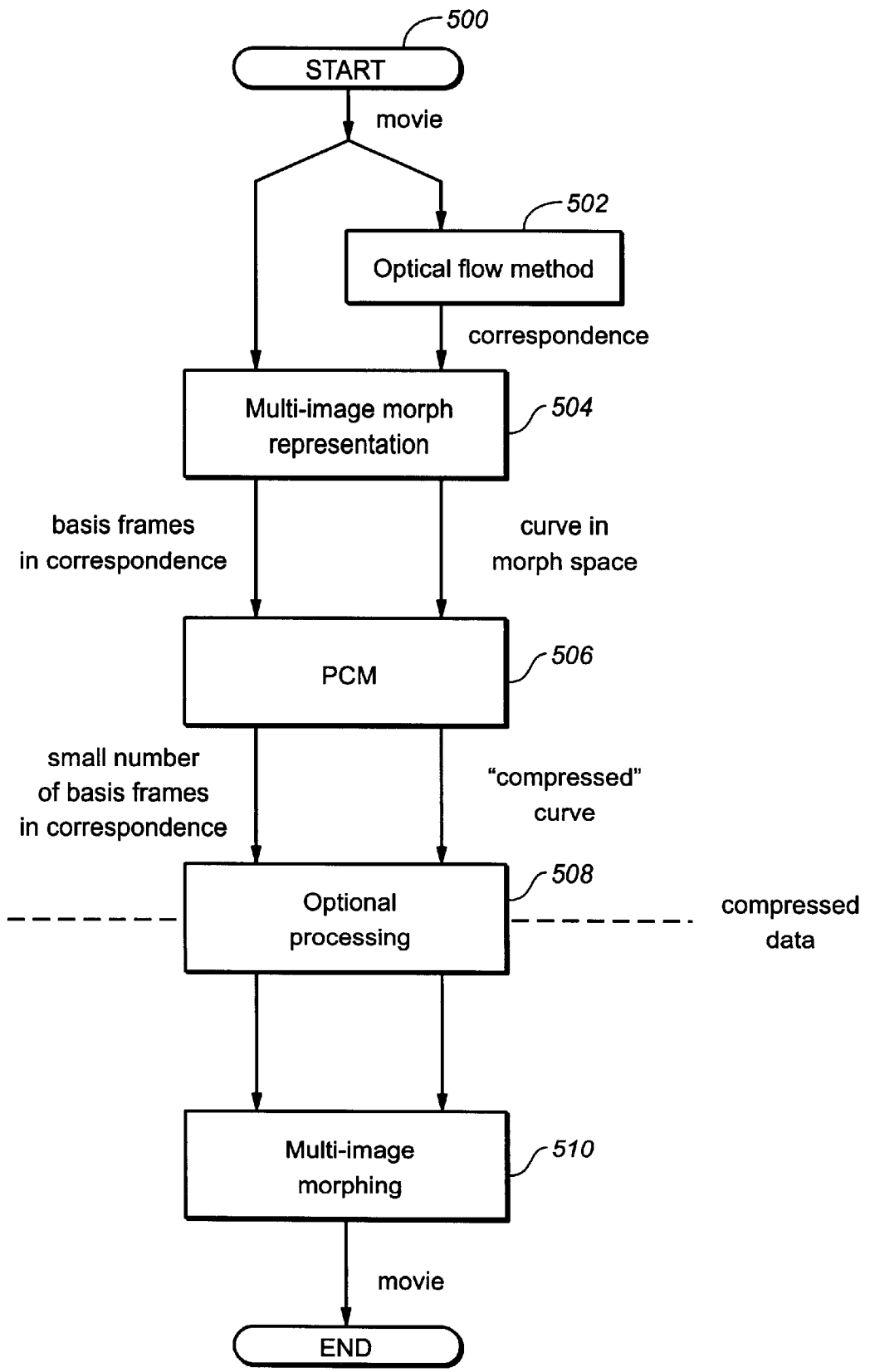
FIG._7

COMPRESSION AND EDITING OF MOVIES BY MULTI-IMAGE MORPHING

BACKGROUND

The emergence of multimedia computing is driving a need for digitally transmitting and receiving high quality motion video. The high quality motion video consists of high resolution images, each of which requires a large amount of space in a system memory or on a data storage device. Additionally, about 30 of these high resolution images need to be processed and displayed per second in order for a viewer to experience an illusion of motion. As a transfer of large, uncompressed streams of video data is time consuming and costly, data compression is typically used to reduce the amount of data transferred per image.

In motion video, much of the image data remains constant from one frame to another frame. Therefore, video data may be compressed by first describing a reference frame and then describing subsequent frames in terms of changes from the reference frame. Standards from an organization called Motion Pictures Experts Group (MPEG) have evolved to support high quality, full motion video. One primary operation performed in MPEG is block matching. A motion vector describing the offset between the current frame and a best match block is then computed. The motion vector is subsequently sent back to a host processor. Through the motion vector, MPEG allows a plurality of images to be compressed, along with code for performing a decompression.

In this light, the decompression process is analogous to an operation known as morphing. The morphing operation changes one picture into another by creating a smooth transitional link between the two pictures. The process preserves features associated with each image by mapping the features from a source image to corresponding features in a destination image. In one version of the conventional morphing process, given two pictures and correspondences between them, the morphing process produces a movie using the two pictures. Further, in a copending application, filed by Todor Georgiev on Apr. 17, 1998 and entitled "MULTI-IMAGE MORPHING", hereby incorporated by reference, multiple images may be morphed together to create a plurality of morphing movies.

SUMMARY

A computer-implemented method for compressing a movie having a sequence of frames is disclosed. The method generates a compressed movie in terms of a few pictures in the original movie and correspondences among the pictures by: enumerating a pixel level frame to frame correspondence, representing the original frame sequence as a multi-image morph, extracting feature vectors describing principle changes from one frame to another frame, and performing a multi-image morphing as an "uncompressing" operation.

Implementations of the invention include the following. The correspondence generating step processes the frames using an optical flow method. The feature extracting step uses a principal components method. Further, if the movie has an original frame rate, the invention may resample the movie at a different frame rate. Moreover, the invention supports the editing of gestures and motions of a character in the movie. The method also allows the multi-image morphing to generate motion blur. The method also compensates for vibrations by discarding certain basis vectors or principal components.

Advantages of the invention include the following. A high movie compression rate is achieved. Moreover, the gestures and motions of characters in the movie may be edited.

BRIEF DESCRIPTION OF THE DRAWINGS

FIG. 1 is a flow chart of a process for morphing among multiple images.

FIG. 2 is a diagram illustrating warping.

FIG. 3 is a diagram illustrating multi-image warping.

FIG. 4 is a diagram illustrating multi-image morphing.

FIG. 5 is a flow chart of a process for morphing among multiple images using meshes.

FIG. 6 is an example illustrating the operation of the invention in transporting facial expressions between two persons.

FIG. 7 is a flow chart of a process for compressing and editing a movie.

FIG. 8 is a diagram of a computer system.

DESCRIPTION

A. Morphing Among Multiple Images

Referring now to FIG. 1, a process 10 for morphing among multiple images is shown. The process 10 receives as input a plurality of warping mappings $W_1, W_2, \ldots, W_n$ which map points located in a second space (uv space) to points located in a first space (xy space) (step 11). The process operates on a plurality of images, each image consisting of a plurality of points in the first space each point with associated color defined by a function $f_i$ on the first space, where the index $i (1 \leq i \leq n)$ enumerates all images. The process also receives as input a set of coefficients $a_1, a_2, \ldots, a_n$ which parameterize the morph.

The process 10 generates a new warping function W based on the coefficients $a_1 \ldots a_n$ and the warping functions $W_1 \ldots W_n$ (step 12). Each warping function $W_i$ maps the points of the second space to points on the first space. Here, $W = a_1 W_1 + a_2 W_2 + \ldots + a_n W_n$.

Next, an inverse mapping $W^{-1}$ of the warping function W is determined (step 14). $W^{-1}$ maps the points of the first space to the second space. Concurrent with steps 12 and 14, the process 10 warps the original pictures (step 16). $W_1$ in this case is chosen to be the identity mapping. Step 16 can be described as repeating n times the following 2 steps:

1. Using $W_i$, map each point in the second space into the first space.

2. Each point on the first space has a color $f_i$ from the $i^{-th}$ picture. Take this color and assign it to the starting point in the second space.

Next, the process 10 blends the above n colors by constructing the weighted average with weights $a_1 \ldots a_n$ (step 18).

Finally, in step 20 the process 10 generates a new picture on the first space by applying the inverse of the warping function to the points in the first space and then assigning to them the colors calculated in step 18.

FIGS. 2–4 show the process 10 in more detail. In FIG. 2, the warping of one picture 120 is shown. The warping process differs from the morphing process in that the warping process does not affect the color of the image. The picture may be expressed as a function f which assigns a color to each pixel in the uv space. The picture 120 is warped into a picture 130 with coordinates (x, y) in the xy space. The picture 130 is produced by assigning a color to each pixel in the xy space applying $W^{-1}$ and then the function f.

FIG. 3 describes multi-image warping. Given n warping transformations $W_1, \ldots W_n$ from uv space to xy space and one picture f on the uv space, a multi-image warping operation is performed by applying an inverse mapping $(a_1 W_1 + a_2 W_2 + a_3 W_3 + \ldots)^{-1}$ to (x,y) and then applying f.

This process is called multi-image warping because $W_i$ are assumed to be derived from or associated with correspondences between n images, although only one of these images is used for the color of the final warp.

FIG. 4 describes the multi-image morphing process 10. In this process, the inverse mapping $(a_1 W_1 + a_2 W_2 + a_3 W_3 + \ldots a_N W_N)^{-1}$ is applied to (x,y). A new f is then applied. Stated in pseudocode, the new function f is:

for each point (u,v), apply $W_i$ then apply $f_i$ and take this color times coefficient $a_i$, and add the results together. This is a picture in the second space (uv space).

The processes shown in FIGS. 1 and 4 may be expressed mathematically as:

$$\text{morph} = (a_1 f_1 \circ W_1 + a_2 f_2 \circ W_2 + \ldots + a_n f_n \circ W_n) \circ (a_1 W_1 + a_2 W_2 + \ldots + a_n W_n)^{-1}$$

where the $\circ$ stands for composition and the morph operation acts on the right (xy space). The mathematics behind the multi-image morphing process is discussed in more detail in Todor Georgiev's Thesis entitled "Morphing Between Multiple Images: Theory and Applications," June 1997, available from the Department of Computer Science in the Graduate School, Southern Illinois University at Carbondale, hereby incorporated by reference.

Referring now to FIG. 5, one implementation of a multi-image morphing process 100 is shown. This is a method for converting any 2-image morphing computer program, that internally uses meshes, into a multi-image morphing program. In mesh warping, the warping functions are approximated by pairs of meshes. In order to do n-image morphing given n pictures, the user builds n meshes (step 102), as discussed in more detail below. The result is control points in the first picture and their corresponding control points across all n pictures. For a given control point on picture 1 and corresponding points on pictures 2 through n, a new point which is a linear combination of all of the above points is generated (points are treated as vectors). The entire process is then repeated for all control points. The result is a mesh that is a "weighted average" of n meshes with weights $a_1, a_2, \ldots, a_n$ (step 104). The weighted average mesh together with the mesh associated with the first picture are used to do the warping in step 110.

Concurrently, in step 106, the 2-image warping process generated by mesh 1 and mesh i is applied to pictures i=1 . . . n to generate n warped images from picture 1 onto picture 1, from picture 2 onto picture 1, . . . , and from picture n onto picture 1. The n pictures are blended together using coefficients (weights) $a_1, a_2, \ldots, a_n$ in step 108.

The 2-image warping process is then used with the following inputs: the intermediate picture created by step 108, the original mesh on picture 1, and the "weighted average" mesh to generate the multi-image morph (step 110).

The determination of the warping functions $W_i$ is discussed next. In n-image morphing, a correspondence among n images is needed (step 102). This correspondence may be generated using existing 2-image morphing tools to generate meshes that relate picture 1 and picture 2, picture 1 and picture 3, . . . picture 1 and picture n, for a total of n−1 correspondences. W is typically approximated using a mesh correspondence approach. In this approach, key points in the n pictures (one from each picture) are identified by selecting a point in the first picture and corresponding points on the pictures 2 through n. This process is repeated for the remaining key points.

These points on each picture are then connected, forming a fine mesh consisting of small triangles or quadrilaterals, among others. The meshes on the pictures are, generally speaking, deformed. This deformation is captured in a transform done in order to fit the quadrilateral in one picture to the corresponding quadrilateral on another. A number of transforms may be used. A good description can be found in G. Wolberg, "Digital Image warping", IEEE Computer Society Press, Los Alamitos, Calif. (1990). In general, they take as input an image in a quadrilateral on one picture and produce a deformed image which is fit to the corresponding quadrilateral on the other picture. The quadrilateral warping methods may include bilinear warping, bicubic warping and perspective warping, among others. They all use data from the meshes (corners of source and destination quadrilaterals) as input parameters. The constructed meshes approximate the warping functions $W_i$.

The selection of the coefficients $a_1, \ldots, a_n$ is described next. In most cases the input images are such that at least one point remains the same across all of them. Then, it is natural to expect that this point or points do not move in the morph. This is achieved by imposing the constraint $a_1 + a_2 + \ldots + a_n = 1$. The above constraint also guarantees that if the initial pictures are significantly different, the morph never collapses into a point or expands to infinity.

Any point in the affine space defined by the above constraint represents a picture (morph). The above space will be referred to as morph space. Any curve in morph space represents a sequence of pictures, or a movie.

The changes between pictures can be represented as vectors in morph space. Given any two points (pictures) in the morph space, the change vector is their difference. These vectors may be used to alter other pictures or to animate pictures. The change vectors may be added or combined to obtain additional changes. Thus, the first picture can be generated by a point in morph space (or corresponding coefficients $a_i$) (1, 0, 0, . . . , 0); the second picture can be generated by the point (0, 1, 0, . . . , 0), . . . and the n-th picture is generated by the point (0, 0, 0, . . . , 1). The change from the first to the second picture would be represented by the vector change$_{12}$=(−1, 1, 0, . . . , 0). There are n*(n−1)/2 such changes, but only n−1 of them are independent. The others can be represented as linear combinations of n−1 basis vectors, which can be chosen as change$_{12}$, change$_{13}$, . . . , change$_{1n}$. From the above, it can be seen that change vectors have coordinates that add up to zero. Further, by adding a change vector to a point, a new point is generated whose coordinates add up to 1, as it has to be in order to satisfy the constraint.

Change vectors can be used in animation. For example, n pictures of a face to be animated may be used as key points in the morph space. The above basis vectors may be scaled and added to the initial points to produce a visible change proportional to the difference between the corresponding initial pictures (such as pictures with a smiling face and a neutral face). A starting picture is selected and small increments of change vectors with direction and length precisely chosen by the user are added. The increments may include, for example, a 50% smile and 20% surprise in the first frame, a 53% smile and 15% surprise in the next frame, and so on. The resulting animation is generated in an automated way, with directions and behavior fully under the user's control. Validity of the resulting transforms is automatically guaranteed, in other words the constraint always holds and as a result the output pictures are more stable than they are in ordinary morphing.

Turning now to FIG. 6, an example of a transformation which "transports" a facial expression from an image of one person to another is shown. Given an original face 300, which is not smiling, and a smiling face 302 of the same person, a new face 304 of another person can be morphed to simulate the second person's smiling in exactly the same way as the original face 300. In this example, a 2-D morph space for a 3-image morphing (the 3 input images being 300, 302 and 304) is determined by finding the change vector 301 from the neutral face 300 to the smiling face 302 and by applying the 3-image morphing to add the change to the new face 304. The result is a smiling new face 306. By scaling the change vector we can achieve any degree of smiling, even "inverse smiling". The change vector 301 may be applied to any other images. Additionally, a library of facial expressions may be stored as change vectors and applied with different weight factors to achieve modified images whose changes may be minor to gross, ranging from barely perceivable to exaggerated caricatures.

A movie in the above representation is a curve in the morph space, which may be represented as a sequence of change vectors. Given a morphing movie, the acting characters may be easily replaced or altered. For instance, a picture of a new character may be added to the morph space by generating a correspondence to one of the frames. As a result each frame is represented by n+1 parameters, the last one describing the input of the new picture. The addition of a change between a given frame and the new picture to all of the remaining frames shifts the whole movie and changes the appearance of the characters. This process is called "translation".

The most general transform is the affine morphism where the change vector is multiplied by a matrix and a translation is performed. The translation not only replaces the old characters with new ones, but also changes the types of motions they do. These mathematical operations can be used to achieve an extremely wide set of possible changes and transformations from one movie to another. The movie can be a real movie or animation. The only condition is that it is represented as a morph, in other words, there is correspondence among all frames.

This is a much more flexible method than the animation technique of "inbetweening," which always combines only two pictures. Often, simple mathematical curves such as sin(x) produce very good results, with little effort.

Further, the color of the picture may be modified so that a black and white picture may be converted into a color picture. In this case, a color picture of a different person of the same race, color of the eyes and hair is taken and converted to black-and-white picture. A 2-D morph space of 3 pictures is constructed and the inverse vector of change is added to the original black-and-white picture to generate a color version of the original black and white picture.

B. Compressing/Editing of Movies Using Multi-Image Morphing

Referring now to FIG. 7, a process 500 for compressing a movie clip in conjunction with multi-image morphing is shown. First, the process 500 provides a frame sequence with n frames of a movie clip to a block 502 to extract the optical flow. Here, the process operates on one movie clip showing one scene that changes smoothly. The optical flow block 502 generates n−1 correspondence mappings $W_2 \ldots W_n$ from the first frame to each other frame, possibly represented as meshes (which is equivalent to vector fields or other representations). The optical flow method is discussed in more detail in B. Horn, "Robot Vision" MIT Press, Cambridge, Mass. (1986) pp. 278–298, hereby incorporated by reference.

The optical flow block 502 generates as output correspondences which are provided to a block 504 which represents the movie as a multi-image morph. The multi-image morph representation block 504 also receives the movie frames as input. It generates basis frames which are in correspondence with each other as well as a representation of a curve describing the movie in the morph space. In one implementation, this block picks the n input frames as basis frames and generates the curve as a Bezier or another spline which approximates the input meshes or vectors. In another implementation, it may interpolate or morph between several frames to produce a smoother representation of the movie with fewer frames.

These outputs are provided to a principal components method (PCM) block 506. The PCM block 506 uses points of the curve as input vector to extract basis vectors of the subspace ("principal components") with the highest dispersion and in this way preserves the highest possible entropy (information). At this point, the user specifies the dimension of the space and in this way selects the compression level. The PCM block 506 extracts principal component vectors which best describe changes from one frame to another. The number of principal component vectors that represent the original movie is smaller than the dimension of the original morph space. By omitting low weight components, lossy compression is achieved without losing a significant amount of information. PCM is described in more detail in R. Johnson and D. Wichern, "Applied Multivariate Statistical Analysis", Prentice-Hall, Englewood Cliffs, N.J., 1982; P. Devijver and J. Kittler, "Pattern Recognition: a statistical Approach" Prentice-Hall, London, 1982; M. Turk, A. Pentland, *Eigenfaces for Recognition*, Journal of Cognitive Neuroscience, Vol. 3, Number 1, 1991; A. Jain, "Algorithms for Clustering Data", Prentice-Hall, Englewood Cliffs, N.J., 1988; and M. Tatsuoka, "Selected Topics in Advanced Statistics" No. 6, published by the Institute for Personality and Ability Testing. 1602–04 Coronado Drive, Champaign, Ill. 61820, hereby incorporated by reference.

The new basis frames are constructed by the process 500 and, in general, are not in the original input frame sequence. They are generated using the multi-image morphing process by first applying PCM to produce basis vectors (principal components), each with certain weight. (The user-defined compression rate picks only those basis vectors with weights higher than a predetermined threshold). Next, by multi-image morphing in the original (big) morph space, each of the images corresponding to the above vectors is constructed. These images, together with the inherent correspondences among them are used to construct a new, much smaller morph space. Also, the curve is modified to a new curve and is represented in terms of the above basis vectors (principal components) by projecting the control points onto the small subspace spanned by those vectors.

As a result, the output of the PCM block 506 is the small set of new basis frames in correspondence as well as the new curve in the low dimensional morph space. At this stage, the output is a compressed representation of the movie. The compressed representation may be saved or transmitted. It may also be provided to an optional block 508 for editing gestures, changing frame rates, and performing motion blur.

In order to reconstruct the movie, the compressed data is provided to other processes such as a multi-image morphing process 510. Block 510 may simply be the process of FIG. 1 or FIG. 4.

The optional block 508 may alter the frame rate by converting from one frame rate to another. New frames may be created at any points on the curve. This allows the movie to be resampled at a different frame rate than its original frame rate. The block 508 may also perform motion editing by selecting certain principal components and building a movie from these components only. In this way, certain motions and gestures disappear and others can be enhanced. Moreover, by switching their basis vectors, one type of motion may be replaced by another. Arbitrary linear combinations of motions and gestures may be created in this manner as well. A movie could be "cleaned" by extracting the first components to remove artifacts caused by vibrations. Vibrations introduced by the camera man may be eliminated by keeping a certain level of compression so that this is also a method for video stabilization.

The block 508 may perform motion blur. At each frame, the curve in the morph space has a tangent vector. In order to perform the motion blur, the colors of each frame are averaged along the velocity field generated by that tangent vector and the warping transformations. The average color is used in place of the original color at each point.

Additional details about the underlying mathematics are discussed in Todor Georgiev's publication entitled "Movie Compression and Motion Editing by Multi-Image Morphing", March 1998, available at www.graphics.lcs.mit.edu/~mcmillan/IBRWorkshop/RegPost.html, and hereby incorporated by reference.

The techniques described here may be implemented in hardware or software, or a combination of the two. Preferably, the techniques are implemented in computer programs executing on programmable computers that each includes a processor, a storage medium readable by the processor (including volatile and nonvolatile memory and/or storage elements), and suitable input and output devices. Program code is applied to data entered using an input device to perform the functions described and to generate output information. The output information is applied to one or more output devices.

FIG. 8 illustrates one such computer system 600, including a CPU 610, a RAM 620, a ROM 622 and an I/O controller 630 coupled by a CPU bus 640. The I/O controller 630 is also coupled by an I/O bus 698 to input devices such as a keyboard 660 and a mouse 670, and output devices such as a monitor 680. The I/O controller 630 also drives an I/O interface 690 which in turn controls a removable disk drive 692 such as a floppy disk, among others.

Variations are within the scope of the following claims. For example, instead of using a mouse as the input devices to the computer system 600, a pressure-sensitive pen or tablet may be used to generate the cursor position information. Moreover, each program is preferably implemented in a high level procedural or object-oriented programming language to communicate with a computer system. However, the programs can be implemented in assembly or machine language, if desired. In any case, the language may be a compiled or interpreted language.

Each such computer program is preferably stored on a storage medium or device (e.g., CD-ROM, hard disk or magnetic diskette) that is readable by a general or special purpose programmable computer for configuring and operating the computer when the storage medium or device is read by the computer to perform the procedures described. The system also may be implemented as a computer-readable storage medium, configured with a computer program, where the storage medium so configured causes a computer to operate in a specific and predefined manner.

While the invention has been shown and described with reference to an embodiment thereof, those skilled in the art will understand that the above and other changes in form and detail may be made without departing from the spirit and scope of the following claims.

What is claimed is:

1. A method for representing a movie having an original frame sequence, comprising:

generating a pixel level frame to frame correspondence;

representing the original frame sequence as a multi-image morph, wherein representing the original frame sequence as a multi-image morph comprises representing each frame in the sequence as a point $(a_1, a_2, \ldots, a_n)$ in an n-dimensional affine morph space defined by a set of warping mappings $W_i$ and associated color definitions $f_i$ $(1 \leq i \leq n)$, where each $a_i$ is a number and each $W_i$ and $f_i$ is an operator on a planar image space, the coefficients $a_i$ satisfying the constraint $a_1+a_2+ \ldots +a_n=1$;

deriving from the multi-image morph a morph basis of feature vectors describing principal changes among frames; and representing the movie in terms of the morph basis.

2. A computer program stored on a computer-readable medium for compressing a movie having an original frame sequence, the program comprising instructions to:

generate a pixel level frame to frame correspondence;

represent the original frame sequence as a multi-image morph, wherein instructions to represent the original frame sequence as a multi-image morph comprise instructions to represent each frame in the sequence as a point $(a_1, a_2, \ldots, a_n)$ in an n-dimensional affine morph space defined by a set of warping mappings $W_i$ and associated color definitions $f_i$ $(1 \leq i \leq n)$, where each $a_i$ is a number and each $W_i$ and $f_i$ is an operator on a planar image space, the coefficients $a_i$ satisfying the constraint $a_1+a_2+ \ldots +a_n=1$;

derive from the multi-image morph a morph basis of feature vectors describing principal changes among frames; and represent the movie in terms of the morph basis.

3. A method for representing a movie having an original frame sequence and for generating a motion blur in the movie, the method comprising:

generating a pixel level frame to frame correspondence;

representing the original frame sequence as a multi-image morph;

deriving from the multi-image morph a morph basis of feature vectors describing principal changes among frames;

representing the movie in terms of the morph basis; and calculating an average color to substitute for an original color for each point in a blurred frame in the movie, the average color being calculated by averaging colors taken from each basis frame along a velocity field generated by a tangent vector and the warping transformations at the blurred frame, the tangent vector being a vector tangent to a curve representing the movie in a morph space defined by the morph basis.

4. A computer program stored on a computer-readable medium for compressing a movie having an original frame sequence and for generating a motion blur in the movie, the program comprising instructions to:

generate a pixel level frame to frame correspondence;

represent the original frame sequence as a multi-image morph;

derive from the multi-image morph a morph basis of feature vectors describing principal changes among frames;

represent the movie in terms of the morph basis; and calculate an average color to substitute for an original color for each point in a blurred frame in the movie, the average color being calculated by averaging colors taken from each basis frame along a velocity field generated by a tangent vector and the warping transformations at the blurred frame, the tangent vector being a vector tangent to a curve representing the movie in a morph space defined by the morph basis.

5. The method of claim 1, wherein the correspondence generating step processes the frames using an optical flow method.

6. The method of claim 1, wherein the deriving step uses a principal components method.

7. The method of claim 6, further comprising compensating for vibrations of movie frames represented in terms of the morph basis by discarding one or more high weight principal components.

8. The method of claim 1, wherein the movie has a first frame rate, further comprising resampling the movie represented in terms of the morph basis at a second frame rate.

9. The method of claim 8, wherein the movie is represented as a curve defined in an affine morph space and resampling comprises calculating points on the curve at intervals defined by the second frame rate.

10. The method of claim 1, wherein the movie has a character with a gesture, further comprising editing the gesture.

11. The method of claims 3 or 1, further comprising compressing the movie by using a subset of the basis.

12. The method of claims 3 or 1, further comprising displaying the movie by performing a multi-image morphing.

13. The method of claim 1, further comprising:

selecting a compression level; and using the compression level to limit the number of feature vectors in the morph basis.

14. The method of claim 2, further comprising:

constructing a set of new basis frames from the basis of feature vectors, each new basis frame corresponding to one of the feature vectors in the basis of feature vectors, wherein the new basis frames are not in the original frame sequence.

15. The method of claim 1, further comprising representing the original frame sequence as a parametric curve fit to the points $(a_1, a_2, \ldots, a_n)$ in the morph space.

16. The program of claims 4 or 2, wherein the correspondence generating instruction processes the frames using an optical flow method.

17. The program of claims 4 or 2, wherein the deriving instruction uses a principal components method.

18. The program of claim 17, further comprising instructions for compensating for vibrations of movie frames represented in terms of the morph basis by discarding one or more high weight principal components.

19. The program of claim 2, wherein the movie has a first frame rate, further comprising instructions for resampling the movie represented in terms of the morph basis at a second frame rate.

20. The program of claim 19, wherein the movie is represented as a curve defined in an affine morph space and resampling the movie comprises calculating points on the curve at intervals defined by the second frame rate.

21. The program of claims 4 or 2, wherein the movie has a character with a gesture, further comprising instructions for editing the gesture.

22. The program of claims 4 or 2, further comprising instructions to compress the movie by using a subset of the basis.

23. The program of claims 4 or 2, further comprising instructions to display the movie by performing a multi-image morphing.

24. The program of claim 2, further comprising instructions to:

select a compression level; and use the compression level to limit the number of feature vectors in the morph basis.

25. The program of claim 2, further comprising instructions to:

construct a set of new basis frames from the basis of feature vectors, each new basis frame corresponding to one of the feature vectors in the basis of feature vectors, wherein the new basis frames are not in the original frame sequence.

26. The program of claim 2, further comprising instructions to represent the original frame sequence as a parametric curve fit to the points $(a_1, a_2, \ldots, a_n)$ in the morph space.

27. The program of claim 2 for generating a motion blur in the movie, the program further comprising instructions to:

calculate an average color to substitute for an original color for each point in a blurred frame in the movie, the average color being calculated by averaging colors taken from each basis frame along a velocity field generated by a tangent vector and the warping transformations at the blurred frame, the tangent vector being a vector tangent to a curve representing the movie in a morph space defined by the morph basis.

* * * * *

UNITED STATES PATENT AND TRADEMARK OFFICE
CERTIFICATE OF CORRECTION

PATENT NO.    : 6,285,794 B1                                                Page 1 of 1
DATED         : September 4, 2001
INVENTOR(S)   : Todor Georgiev and Michael Wainer It is certified that error appears in the above-identified patent and that said Letters Patent is hereby corrected as shown below:

Column 9,
Line 41, please delete "of claim 2" and insert -- of claim 1 --.

Signed and Sealed this

Twenty-seventh Day of August, 2002

Attest:

Attesting Officer

JAMES E. ROGAN
Director of the United States Patent and Trademark Office